United States Patent
Drane et al.

[11] Patent Number: 5,974,601
[45] Date of Patent: Nov. 2, 1999

[54] SMALL ANIMAL WASHING CONTAINER

[76] Inventors: Mark R. Drane, 6971 Bent Creek Dr., Germantown, Tenn. 38138; Michael H. Young, 1896 Alder Branch La., Germantown, Tenn. 38139

[21] Appl. No.: 09/116,619

[22] Filed: Jul. 16, 1998

Related U.S. Application Data

[60] Provisional application No. 60/053,632, Jul. 24, 1997.

[51] Int. Cl.⁶ .................................................. A47K 4/00
[52] U.S. Cl. ........................................ 4/539; 4/546; 4/567
[58] Field of Search ............................... 4/539, 538, 546, 4/553, 570, 567, 559, 571.1, 572.1, 292

[56] References Cited

U.S. PATENT DOCUMENTS

| | | | |
|---|---|---|---|
| 1,116,913 | 11/1914 | Peregoy . | |
| 1,288,347 | 12/1918 | Wilson . | |
| 1,348,250 | 8/1920 | Strachan . | |
| 1,512,068 | 10/1924 | Thornburg | 4/572.1 |
| 1,856,992 | 5/1932 | Gaddess . | |
| 2,457,038 | 12/1948 | Garonis | 4/190 |
| 2,495,965 | 1/1950 | Gustaveson | 4/572.1 |
| 2,605,136 | 7/1952 | Kline et al. | 4/567 |
| 3,417,875 | 12/1968 | Barker | 4/559 |
| 4,656,678 | 4/1987 | Lipski | 4/559 |
| 4,881,281 | 11/1989 | Lavoine et al. | 4/572.1 |
| 4,930,453 | 6/1990 | Laliberte | 119/158 |
| 5,181,284 | 1/1993 | Raphael et al. | 4/572.1 |
| 5,193,487 | 3/1993 | Vogel | 119/158 |
| 5,213,064 | 5/1993 | Mondine et al. | 119/158 |
| 5,259,339 | 11/1993 | McLaughlin | 119/158 |
| 5,361,429 | 11/1994 | Lin | 4/572.1 |
| 5,367,724 | 11/1994 | Coccagna | 4/571.1 |

*Primary Examiner*—David J. Walczak

[57] ABSTRACT

A small plastic animal container assembly or kit of parts for bathing small pets in a home bathtub or shower stall. The container assembly includes foldable legs to raise it to a height that allows a person to stand while administering the bath. The container walls are bowed outward in the middle providing more room for a small animal to easily turn around, yet provide confinement for an animal of predetermined size. The bottom of the container has a centralized drain and pet hair filter channel which runs lengthwise along the entire bottom of the container and includes a sufficient number of strategically placed drain holes to provide for continuous water removal and filtering of loose pet hair. Pockets are integrally molded into the four corners of the container to provide a means to hold pet bathing accessories such as shampoo, a brush, a sponge, etc. A clip is built into or attached to one end of the container to provide a means to hold a variety of sizes of handles used on shower water spray heads. The spray heads are connected to a flexible hose and are part of the bathtub or shower stall fixtures found in many existing bathrooms. The clip provides a place to hold the handle of the spray head in a downward facing position so that the water is directed toward the bottom of the bathtub or shower stall, thus negating the need to turn the water on and off each time you need to apply water to the pet. Texture on the bottom surface of the container provides a non-skid surface for the pet to stand. Slots are formed in the rim of the container to which a retaining strap can be attached to the collar of the animal. The support legs have non-skid feet or shoes to prevent damage and slippage on the bottom surface of the bathtub or shower stall. The legs of the container can be un-snapped from the bottom of the container and folded flat for storage.

4 Claims, 11 Drawing Sheets

SMALL ANIMAL WASHING CONTAINER

This application claims benefit of Provisional application Ser. No. 60/053,632, filed Jul. 24, 1997.

FIELD OF THE INVENTION

The present invention relates generally to a small animal washing or bathing apparatus designed for home use, and more particularly, to an improved user friendly elevated washing container assembly specifically adapted for use in a home bathtub or shower stall for bathing small common household pets, such as small dogs. In even greater particularity, the present invention relates to an improved pet friendly washing container that is specifically designed to be easily cleaned and stored in a minimum amount of time.

BACKGROUND OF THE INVENTION

Currently, pet owners have few options available outside of special commercial grooming facilities or elaborate devices for bathing their pets at home. Small common household pets, such as small dogs, are typically washed in the family bathtub, shower stall, laundry sink, kitchen sink or infrequently in a general purpose style washtub which is usually placed on a patio, driveway or lawn. Such bathing methods, while capable of assisting in the bathing of pets, suffer however from many drawbacks. For example, except for some general purpose wash tubs which are typically used outdoors, almost all of the above known available bathing options share a common problem of exposed drains which are susceptible of being clogged by pet hair that is shed during the bathing procedure.

While the kitchen sink provides an area for bathing small pets, most sinks are not designed or equipped to allow a user to easily bathe a small pet. Besides miniature breeds, many small dogs are simply too large to fit into a common kitchen sink. Moreover, one who is experienced in bathing dogs understands that most become frightened when bathed and frequently try to escape. Therefore, controlling a frightened dog during a bath can require substantial energy and patience. If the dog struggles and escapes, it may injure itself leaping from the kitchen sink to the floor. Furthermore, dogs typically try to shake the water and shampoo from their coats throughout the bathing process which can land on the surrounding counter top adjacent the sink, on the floor which may create a potentially slippery area, on the walls which may have expensive wall coverings, and on the person administering the bath. Besides creating a mess which must be cleaned up, the above typical occurrences may damage costly personal property such as wall coverings or pet hair accumulating in and damaging the disposal.

Most importantly, many people find the idea of bathing a small dog in the kitchen sink offensive and potentially hazardous to ones health because the sink is also used in the preparation of food. Since many dog shampoos include potentially toxic medications for one reason or another, any lingering shampoo or residue in the sink or on the adjacent counter top may be absorbed into food which may be harmful if consumed. Also, because the kitchen sink is one of the primary areas where food is prepared, a person who has bathed their pet in the sink will typically spend more time and energy sanitizing and deodorizing the sink and adjacent area than if the pet were bathed in another area.

A general purpose washtub is not especially adapted to wash a small animal therefore, if used, is inconvenient and time consuming. Moreover, as stated above, the pet must be washed outdoors typically using a garden hose or rinse bucket to rinse the animal. Using a rinse bucket does not normally allow thorough rinsing of the underside of the pet. Since the washtub is usually limited to outdoor use, this option typically prohibits bathing the animal in bad or cold weather. Also, in order to be a somewhat user friendly, the washtub can be placed upon a table or the like. However, if elevated, the washtub will be very difficult to empty once the bathing is completed because most typically do not include drains.

Even though a laundry sink offers a convenient place for bathing small dogs, it suffers from generally the same drawbacks as the kitchen sink. In addition, however, most homes and apartments do not have a laundry sink available, and those that do, most are not equipped with a spray device. Therefore, the person bathing the pet will have to use a rinse bucket to rinse the pet which can be very messy depending on the nature of the pet.

The family bathtub or shower stall both provide an area for washing and rinsing a small animal, however, they too present several disadvantages. One problem associated with using the bathtub or shower stall is that most small dogs will not remain in one place when put into the large area provided by the bathtub or stall. Since the dog must remain standing on the bottom of the tub or stall, the person administering the bath must stoop down on his or her knees and bend uncomfortably over to bathe and control the dog. Such strenuous activity is simply impossible for many people, especially those who suffer from chronic knee or back problems. Moreover, although many home bathtubs or shower stalls are now equipped with removable hand held shower heads that are attached to a flexible hose, the standard length of a flexible hose is typically not long enough to allow the hand held shower head to adequately reach a small dog standing on the bathtub or shower stall floor. In addition, there is not a convenient place to hold or secure the hand held shower head while bathing the pet, therefore it usually cannot, without creating a mess, be left running. Thus, between each rinse, the water typically is turned off, creating a need to readjust the water temperature each time the water is turned back on. Lastly, dog hair will usually accumulate in the tub drain causing potentially expensive plumbing problems.

All of the above described "home" methods for bathing a small pet have some type of undesirable disadvantage. These problems are basically due to the fact that none of the listed "home" bathing areas are designed specifically for small dogs. In an attempt to remedy some of the disadvantages associated with the above described "home" bathing techniques or areas, several pet bathing devices have been designed. While these devices are functional for their intended purpose, they too include many drawbacks not suitable for the average in home user.

One problem associated with known pet bathing devices is that most have multiple part complex constructions which translates into increased cost to the consuming public and increased time necessary to adequately clean the device. A typical pet bathing device includes an elaborate drain screen or filter which is either located over or in an actual drain hole. Besides being difficult to remove, these separate "filtering" devices are difficult to clean after use. Typically, most screens or filters must be removed from the pet bathing apparatus and transported to another location, typically outdoors, to be cleaned and rinsed with a garden hose in order to be thoroughly cleaned. Removing the screen or filter just to clean it in the bathtub or sink would defeat the intended purpose of having the screen or filter in the first place.

Some of the known pet bathing devices also include separate covers, narrow side walls and elaborate neck restraining devices in order to severely limit, if not totally prevent, the animals movement during bathing. Utilizing such features or devices may not only traumatize the animal but also may not be appealing to the consuming public because many dog owners would probably not subject their dogs to such restraint. Moreover, even if such pet bathing devices are specifically designed for commercial use in a professional grooming facility where many dogs are bathed on a regular day-to-day basis, such facilities do not have the same burden or personal responsibility of protecting individual personal property from damage as describe above in the case of home pet bathing.

In view of the foregoing disadvantages inherent in "home" bathing techniques and areas and disadvantages associated with known pet bathing devices, a need exists for a light weight low cost simply constructed small animal washing container assembly designed specifically for small dogs that is both user friendly and pet friendly. A further need in the pet bathing industry exists for a small animal washing container assembly specifically designed for in home use of existing bathroom fixtures. An even further need exists in the industry for a small animal washing container that is specifically designed to be easily cleaned and stored in a minimum amount of time and energy.

SUMMARY OF THE INVENTION

The present invention satisfies the above needs of the pet bathing industry by providing a small animal washing container assembly preferably adapted for bathing a small dog in a home bathtub or shower stall. The assembly includes a plastic container having foldable legs for raising it to a suitable height which allows the person washing the pet to stand while administering the bath. Being able to stand while bathing the dog not only is convenient, but allows the person to maintain better control of the dog and eliminates unnecessary knee and back pain.

In a preferred embodiment, the walls of the container are bowed outward in the middle providing more room for a small dog to easily turn around, yet provide confinement for an animal of predetermined size. A unique "V" or "U" shaped centralized drain and pet hair filter channel is preferably formed as an integral part of the container bottom which runs lengthwise preferably along the entire bottom of the container from one end to the other. The channel is designed for easy cleaning and removal of dog hair and includes a predetermined number and pattern of specifically sized drain holes to provide for continuous water removal and filtering of loose pet hair.

The container assembly may also include pockets which are integrally molded into the four corners of the container to provide a means for holding pet bathing accessories such as shampoo, a brush, a sponge, etc. In a preferred embodiment, a clip is built into one end of the container to provide a means for holding a variety of commercially available handles used on shower water spray heads. Water spray heads are typically connected to a flexible hose and are part of the bathtub or shower stall fixtures. In a preferred embodiment, the clip is specifically designed to hold the handle of the spray head in a downward facing position so that the water is directed toward the bottom of the bathtub or shower stall, thus negating the need to turn the water on and off each time you need to apply water to the pet.

In addition, texture may also be provided on the bottom surface of the container for providing a non-skid surface for the pet to stand. Moreover, slots may be formed in the rim of the container to which a retaining strap can be attached to the collar of the animal. The support legs preferably have non-skid feet or shoes to prevent damage and slippage on the bottom surface of the bathtub or shower stall. The legs of the container can be un-snapped from the bottom of the container and folded flat for storage.

The dog bath is intended to be used in a standard bathtub or shower stall with a hand held flexible shower head. During the bathing process, a small dog is placed into the dog bath and the water is turned on and adjusted for pressure and temperature. Next, the dog is wet down with the shower head. With the water still running, the shower head is placed into the clip holder assembly where the water will spray downward into the bathtub. The dog can then be shampooed and washed. Additional water can be added at any time as it is still running. The water from the shower head will drain out the holes in the container bottom and not permit water to accumulate. The holes are numerous enough to allow water to drain and yet small enough to prevent pet hair from passing through potentially clogging the bathtub drain. Because the container is elevated to a convenient height, the person giving the bath need only stand by the container and can easily reach all areas on the dog. When the bath is complete, the water is turned off and the dog can be towel dried and removed from the container. Pet hair can be easily wiped from the bottom of the container before it is stored.

As can be appreciated by one skilled in the art, the present invention is designed to make bathing a small dog less of a chore. The small animal washing container assembly will enhance and efficiently utilize the function of the bathtub, making it a more suitable place to bathe a dog. It is not dependent upon outside weather conditions and does not compromise the food preparation area of the kitchen sink.

There has thus been outlined, rather broadly, many of the important features of the present invention in order that the detailed description thereof that follows may be better understood, and that the present contribution to the art may be better appreciated. There are, of course, numerous other novel features of the present invention that will become apparent from a study of the drawings and the detailed description and which will form the subject matter of the claims appended hereto. Moreover, it is to be understood that the phraseology and terminology employed herein are for the purpose of description and should not be regarded as limiting. As such, those skilled in the art will appreciate that the conception, upon which this disclosure is based, may readily be utilized as a basis for the designing of other small animal washing container assemblies for carrying out the several purposes and advantages of the present invention. It is important, therefore, that the claims be regarded as including such equivalent assemblies insofar as they do not depart from the spirit and scope of the present invention.

BRIEF DESCRIPTION OF THE DRAWINGS

These and other features, aspects, and advantages of the present invention will become better understood with regard to the following detailed description, appended claims, and accompanying drawings, where:

DETAILED DESCRIPTION OF THE PREFERRED EMBODIMENTS

With reference now to the drawings, a new and improved small animal washing container assembly, embodying the principles and concepts of the present invention, is described below and generally designated throughout the figures by the numeral 10. As most clearly shown in FIGS. 1–4, container assembly 10 includes a housing container 12, preferably in the form of an open-topped tub, integrally formed preferably from a lightweight plastic such as polypropylene or other suitable material. Housing 12 is specifically designed for bathing or grooming a small dog 23 or other small animal preferably having a weight up to approximately 25 pounds and a height up to approximately 15 inches. Housing 12 includes a bottom 13 and a peripheral wall integrally attached to bottom 13 comprising upwardly extending sidewalls 22 and endwalls 21 which cooperate to define an upper opening 17 distal bottom 13. Sidewalls 22 and endwalls 21 may include a peripheral wall rim 32 adjacent upper opening 17 for purposes described below. In a preferred embodiment, housing 12 has a length of approximately 23 inches and a maximum width of approximately 16 inches.

Figure 8:
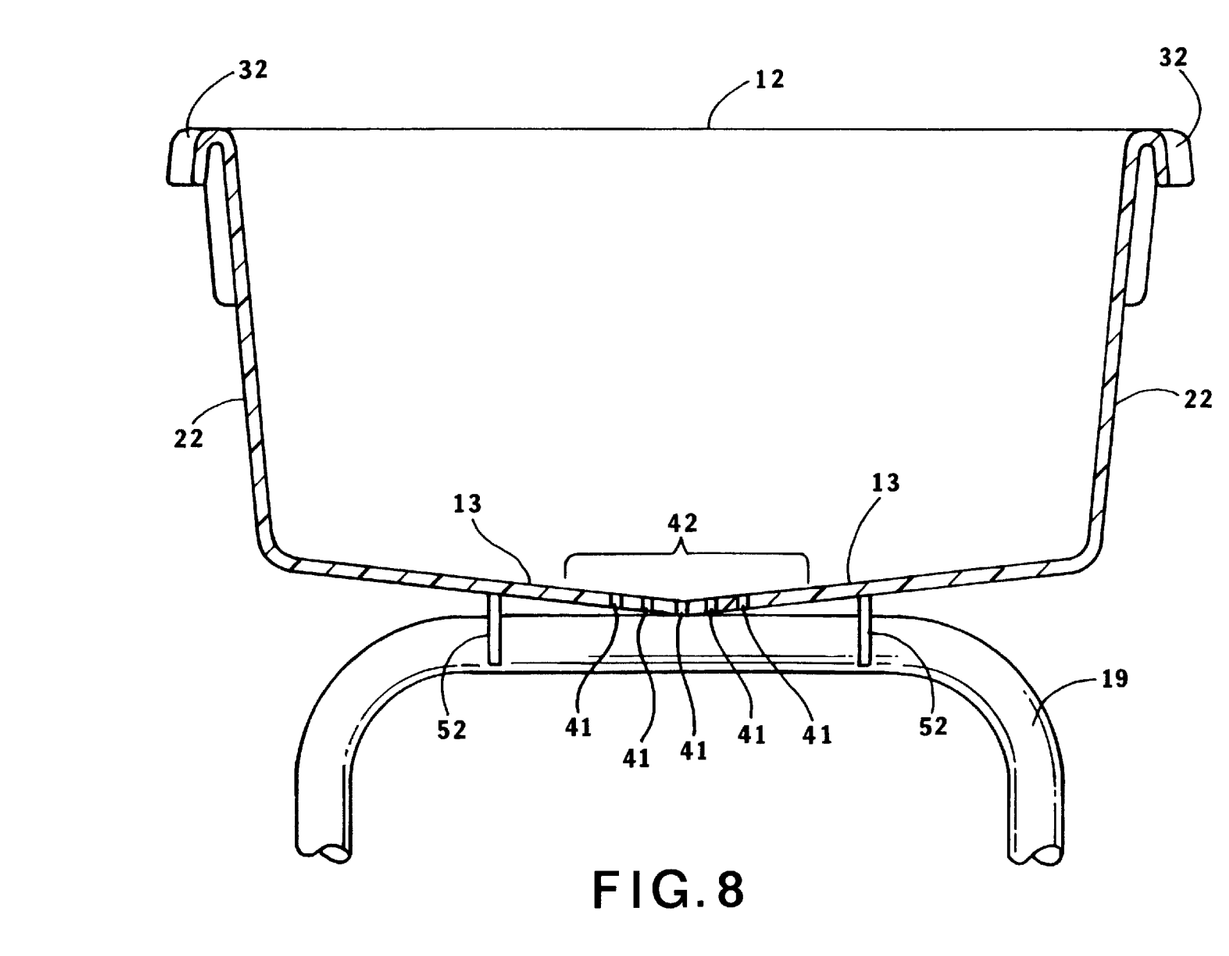
FIG. 8 is a cross-sectional view of the representative small animal washing container assembly shown in FIG. 1 illustrating a centralized drain and pet hair filter channel embodying the features of the present invention.
Figure 9:
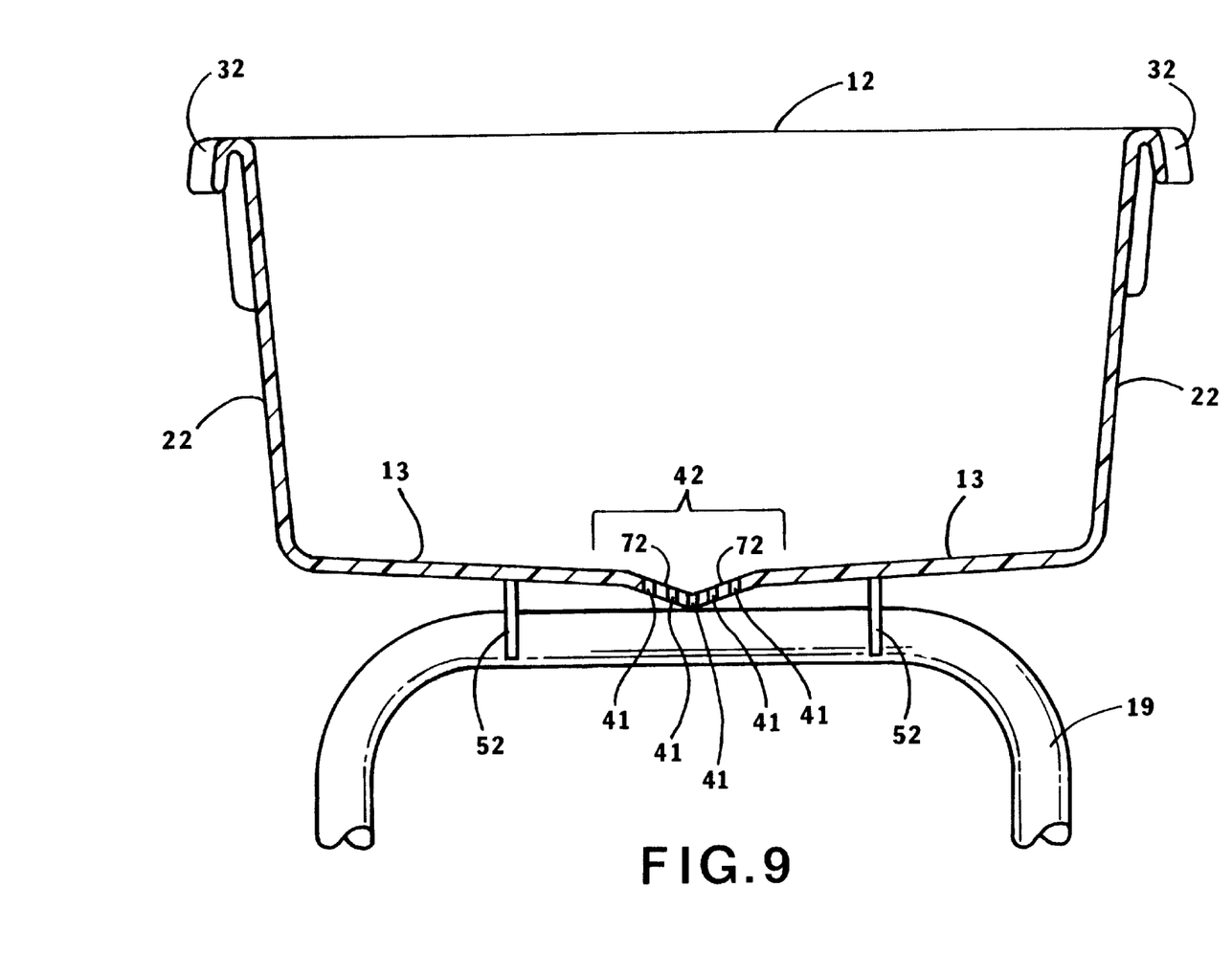
FIG. 9 is a cross-sectional view of the representative small animal washing container assembly shown in FIG. 1 illustrating a first alternative embodiment of the centralized drain and pet hair filter channel embodying the features of the present invention.
Figure 10:
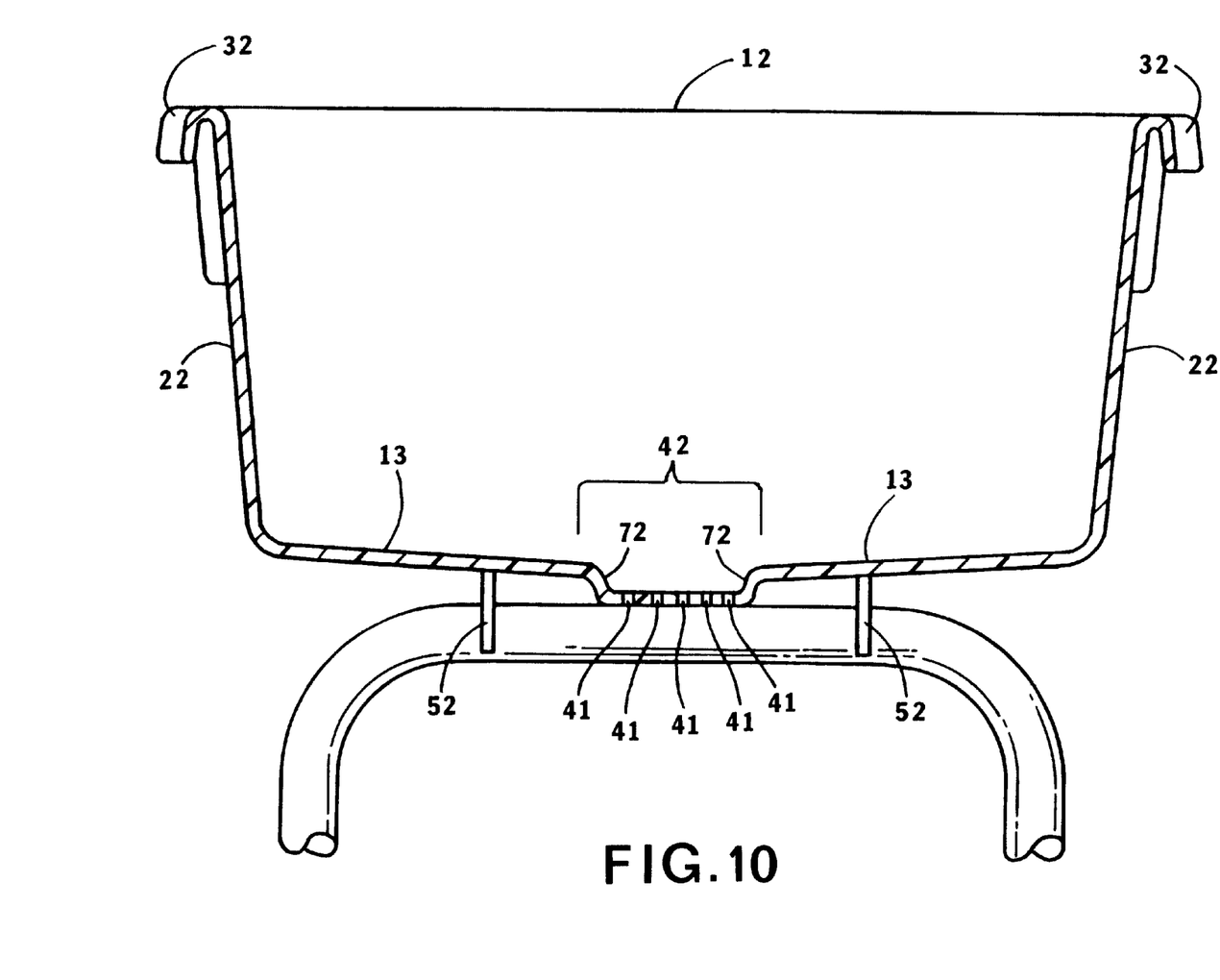
FIG. 10 is a cross-sectional view of the representative small animal washing container assembly shown in FIG. 1 illustrating a second alternative embodiment of the centralized drain and pet hair filter channel embodying the features of the present invention.

Sidewalls 22 and endwalls 21 may extend upwardly generally perpendicular from bottom 13 or, as shown in FIGS. 8–10, may individually or in combination include a slight radially outward slope from bottom 13 to opening 17. In a preferred embodiment, the height of sidewalls 22 and endwalls 21 are the same extending approximately 8 inches vertically from bottom 13. This approximate height is particularly adapted for providing nominal confinement of the size of dog 23 described above during the bathing process as well as for catching and preventing residual pet hair from escaping housing 12 due to, for example, dog 23 shaking its coat.

Figure 1:
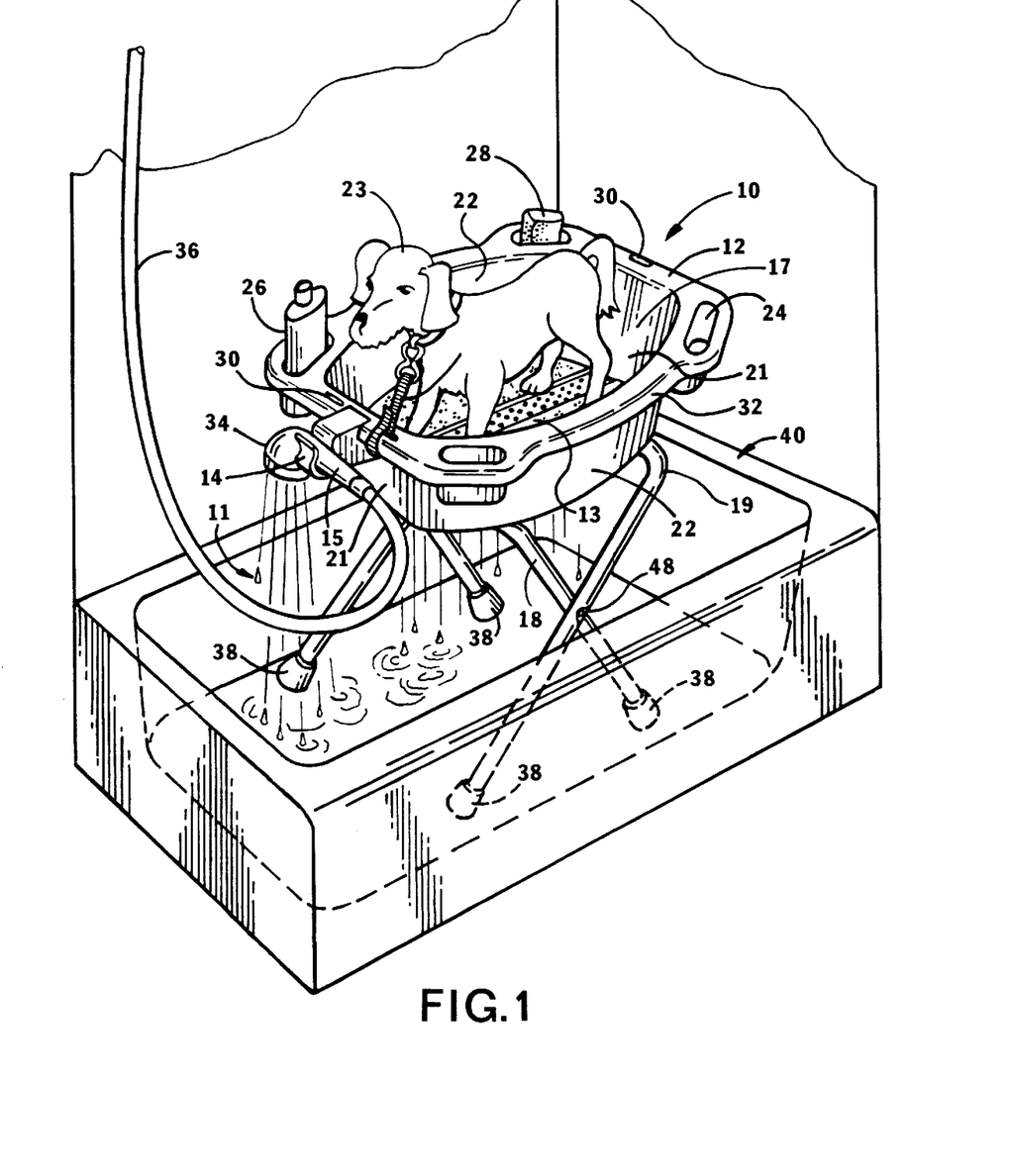
FIG. 1 is a perspective view of a representative small animal washing container assembly embodying the features of the present invention.
Figure 2:
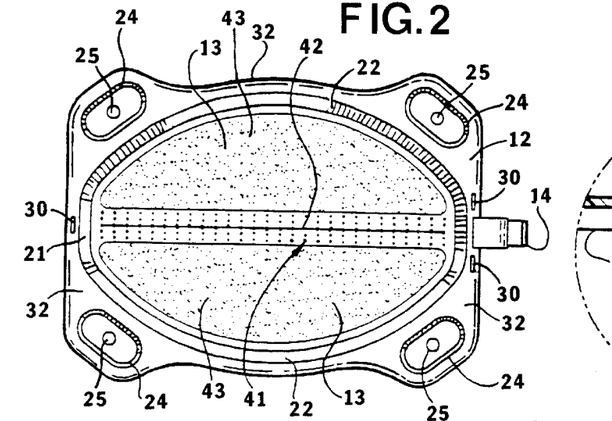
FIG. 2 is a top plan view of the representative small animal washing container assembly shown in FIG. 1 embodying the features of the present invention.
Figure 3:
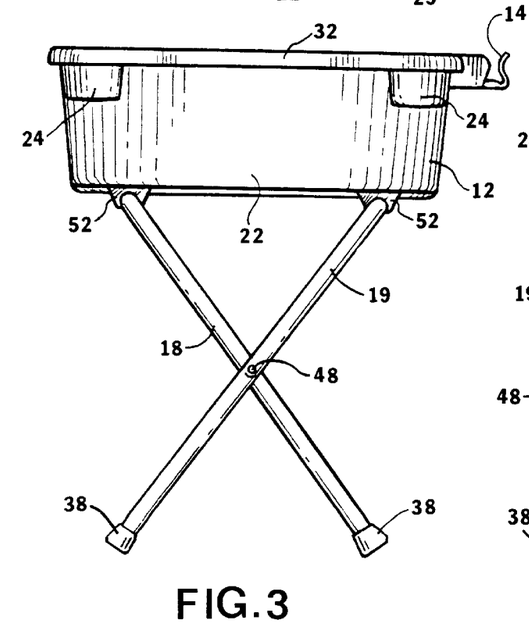
FIG. 3 is a side elevational view of the representative small animal washing container assembly shown in FIG. 1 embodying the features of the present invention.
Figure 11:
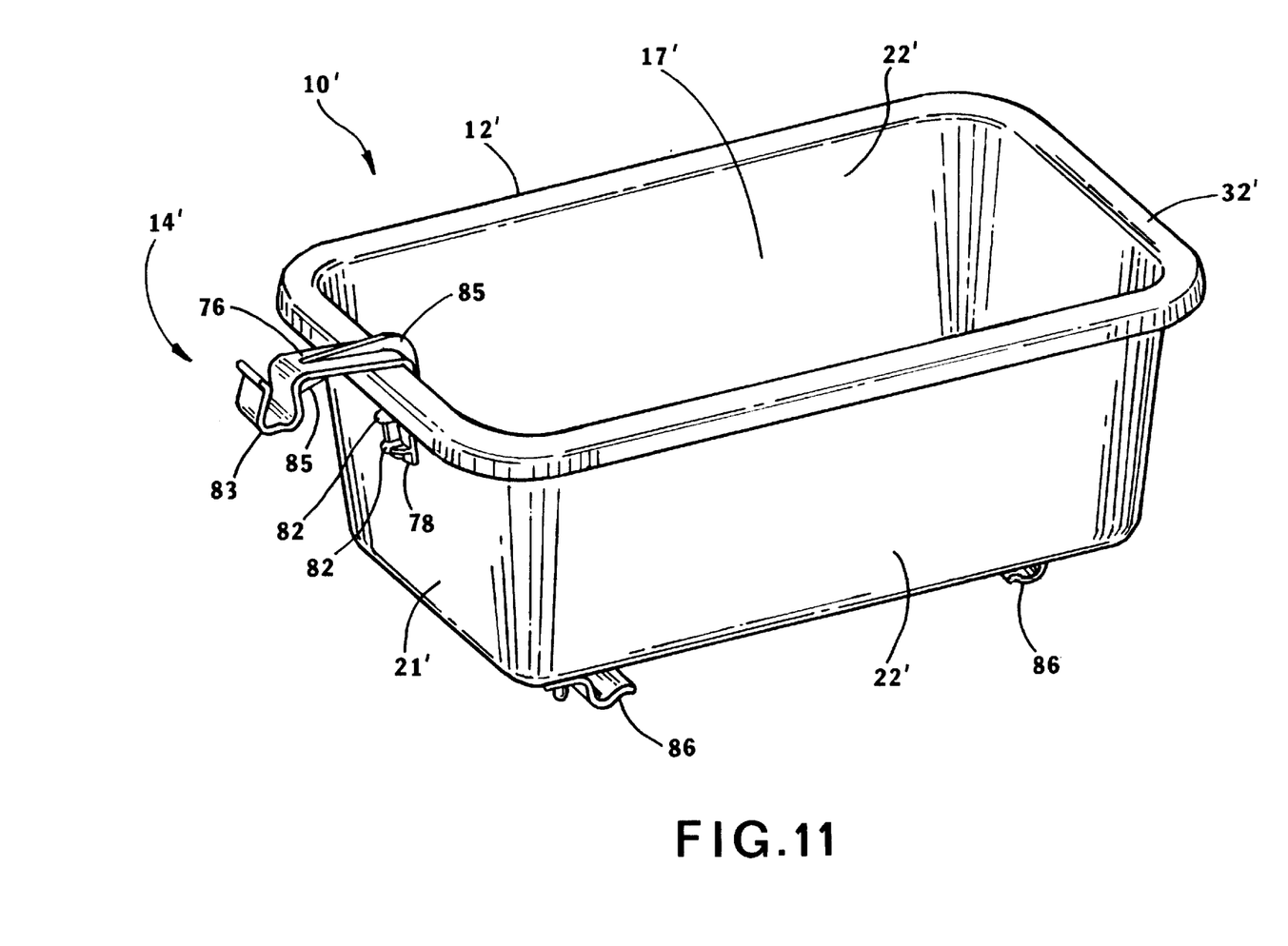
FIG. 11 is a top perspective view of a first alternative embodiment of a small animal washing container assembly embodying the features of the present invention.
Figure 12:
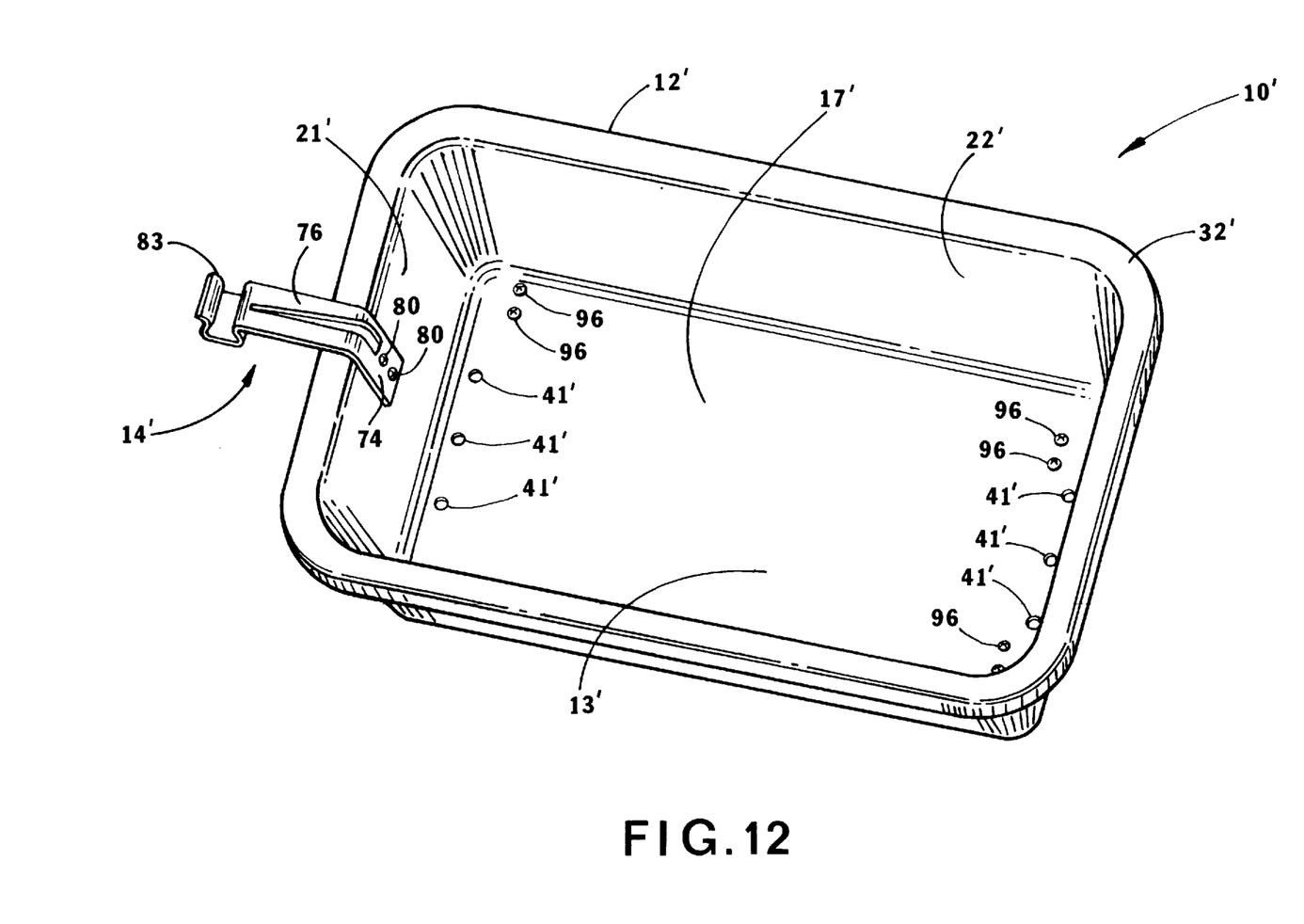
FIG. 12 is another top perspective view of the first alternative embodiment of the small animal washing container assembly shown in FIG. 11 embodying the features of the present invention.
Figure 13:
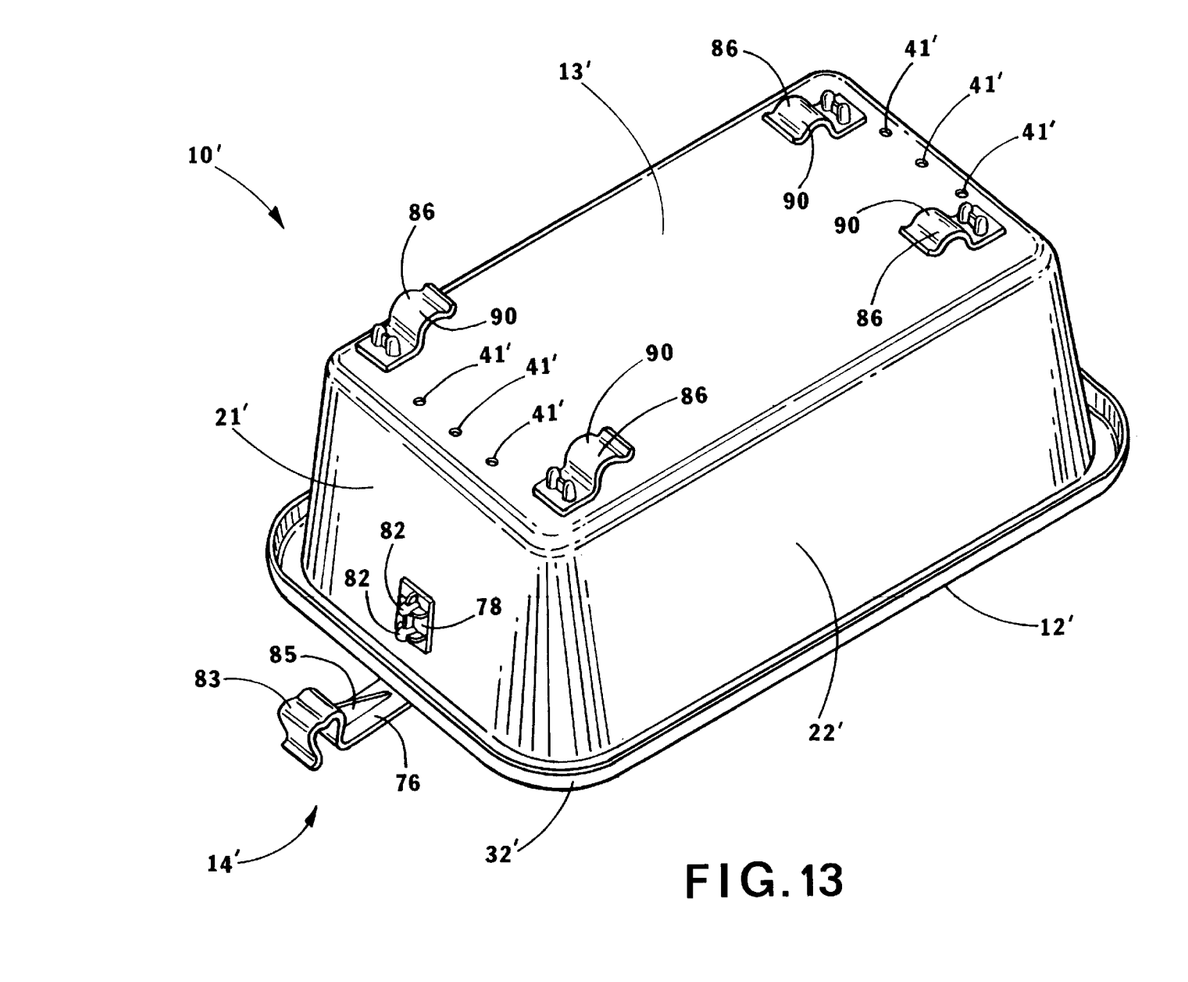
FIG. 13 is a bottom perspective view of the first alternative embodiment of the small animal washing container assembly shown in FIG. 11 embodying the features of the present invention.

Known dog bathes typically include narrow sidewalls for severely limiting, if not totally preventing, movement of the animal during bathing. In a preferred embodiment of the present invention, however, as best illustrated in FIGS. 1 and 2, bottom 13 has a generally elliptical shape which causes sidewalls 22 to curve or bow radially outwardly at the middle portion of housing 12 defining a widened area sufficiently wide to allow a small dog 23 the ability to turn around in housing 12. This feature not only lessens the fear in the dog 23 during the bathing process by not trapping the dog 23, but also allows the user to easily position the dog 23 which decreases the time of bathing. While a generally elliptical shape of bottom 13 is preferred, many other possible shapes or designs are contemplated so long as sidewalls 22 are sufficiently wide to allow rotational movement of dog 23 while in housing 12. For example, in a first alternative embodiment of container assembly 10 as shown in FIGS. 11–13, housing 12 may be generally rectangular in shape having a width sufficiently wide, such as 16 inches, to allow a small dog 23 the ability to turn around in housing 12.

As best shown in FIG. 8, bottom 13 preferably slopes or converges inwardly and in a slightly downward direction from sidewalls 22 to define a centralized drain and pet hair filter channel 42. Channel 42 preferably runs lengthwise along the entire bottom 13 of housing 12 from one endwall 21 to the other and includes a plurality of drain holes 41 for allowing water 11 or other liquids to drain, as illustrated in FIG. 2. The size, number and pattern of drain holes 41 are specifically chosen to provide for continuous water 11 removal, yet are small enough to trap and filter loose pet hair thus preventing such hair from passing through and potentially clogging a bathtub 40 drain. In a preferred embodiment, as shown in FIG. 2, channel 42 includes an array of approximately 140 drain holes 41 arranged in side-by-side relation each having a diameter ranging from approximately 0.120 inches to 0.170 inches. Of course, other numbers and sizes of holes 41 are acceptable so long as they can filter loose pet hair and allow liquids to drain.

FIG. 9 discloses a first alternative embodiment of channel 42. In this embodiment, channel 42 includes a more pronounced generally "V" shape portion which operates to better capture and retain loose pet hair in a centralized area for cleaning purposes. The V-shaped drainage portion of channel 42 consists of two downward sloping surfaces 72 formed in bottom 13 which converge together to generally form a "V" cross-sectional shape at the center of the housing 12. Surfaces 72 preferably span the entire length of channel 42 and slope downwardly at a greater angle than bottom 13 which enhances the directing of water and loose pet hair to the plurality of drain holes 41 which, in this embodiment, are formed through surfaces 72. Unlike most known dog baths where elaborate filters have to be removed and separately cleaned, once the dog 23 has been bathed utilizing the present invention, loose pet hair that has accumulated in the centralized area of channel 42 may be easily removed typically by one wipe of the hand, towel or sponge through the channel 42. This is possible because the drain holes 41 are sized small enough so as to not interfere with or hinder pet hair removal. In a preferred embodiment, the V-shaped portion of channel 42 has a maximum width of approximately 1 inch and a depth ranging from approximately 0.250 to 0.375 inches.

While the V-shaped portion of channel 42 is particularly useful during the cleaning process, other designs are contemplated by the present invention. For instance, FIG. 10 illustrates a second alternative embodiment of channel 42. In this embodiment, channel 42 includes a more pronounced generally "U-shaped" portion having the same approximate overall dimensions as the V-shaped portion of FIG. 9. The U-shaped portion of FIG. 10 operates substantially the same as the V-shaped portion.

Referring again to FIGS. 1 and 2, bottom 13 may also include any suitable form of texture or non-skid surface treatment 43 for allowing dog 23 to easily maintain its footing and balance. In a preferred embodiment, texture 43 substantially covers the top side surface of bottom 13 with the exception of the central area defining the drainage channel 42. As mentioned above, the smooth drainage channel 42 and the size of the holes 41 allow a user to execute a quick pass or wipe with their hand, paper towel, etc., along the channel to remove the shed hair or any other debris quickly and easily with little mess. This is an advantage over the known dog baths in which you must remove filters, screens, etc., separately, which must be cleaned separately at a different location.

Washing container assembly 10 may further include means for detachably securing a handle 15 of a water spray head 34 which is connected to a water supply hose 36. The handle securing means comprises a water spray head holding clip assembly 14 specifically designed to engage handle 15 so that the water spray head 34 is oriented in a downward facing position causing the water 11 to spray in a downward spray direction, as shown in FIG. 1. During the bathing process, water spray head 34 may be removed and replaced as needed. Clip assembly 14 is preferably located at one end of housing 12 above or adjacent to one of the endwalls 21.

Figure 6:
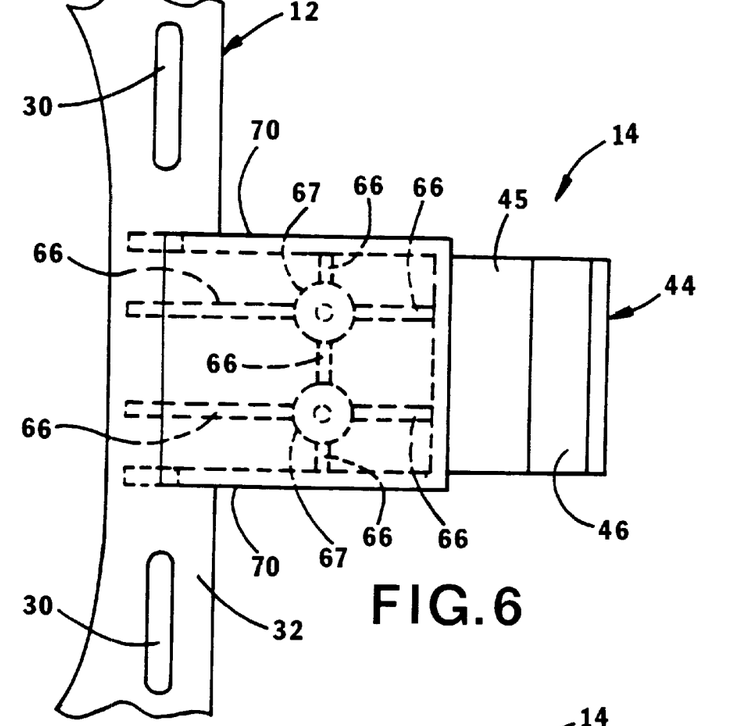
FIG. 6 is an enlarged fragmentary top plan view of the representative small animal washing container assembly shown in FIG. 1 illustrating a water spray head holding clip assembly embodying the features of the present invention.
Figure 7:
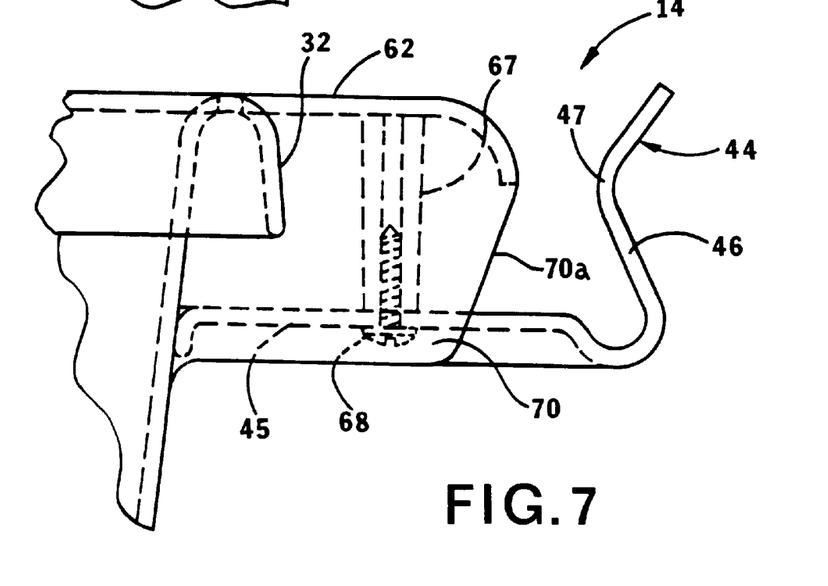
FIG. 7 is an enlarged fragmentary side view of the representative small animal washing container assembly shown in FIG. 1 illustrating the water spray head holding clip assembly embodying the features of the present invention.

In a preferred embodiment, as best shown in FIGS. 6 and 7, clip assembly 14 includes an outwardly extending clip mounting extension 62 integrally molded as part of or to peripheral wall rim 32 of housing 12. Clip mounting extension 62 is reinforced with a plurality of stiffener ribs 66 located parallel and perpendicular to endwall 21 of housing 12. The stiffener ribs 66 are preferably interconnected to two cylindrical bosses 67. A water spray holding clip 44 having a generally flat portion 45 and an upwardly extending generally "S" shaped portion 46 is secured to the underside of the clip mounting extension 62 using any suitable fastening means such as two screws 68 screwed into holes in the bottom of the cylindrical bosses 67. A pair of vertically oriented sidewalls 70 of the clip mounting extension 62 extend along the outer edges of the generally flat portion 45 of clip 44 to provide additional support structure to hold the clip 44 and to provide an extra means for maintaining clip 44 from rotating or turning during use.

The unique "S" shape of portion 46 allows clip assembly 14 to receive and secure in the above described downward facing position virtually all commercially available forms of handle 15 of water spray head 34. In a preferred embodiment, the lower most portion of portion 46 is positioned approximately two inches from the outer edge 70a of sidewalls 70 while the neck portion 47 is positioned approximately 0.566 inches from the outer edge 70a of sidewalls 70. Moreover, clip 44 is preferably constructed from the acetal family of plastics or a blend of acetal with other suitable plastics in order to provide optimum rigidity and flexibility for accommodating various types of commercially available water spray heads 34 and handles 15. One advantage of utilizing the acetal family of plastics is that clip 44 need not be adjustable, one size meets substantially all needs.

Figure 4:
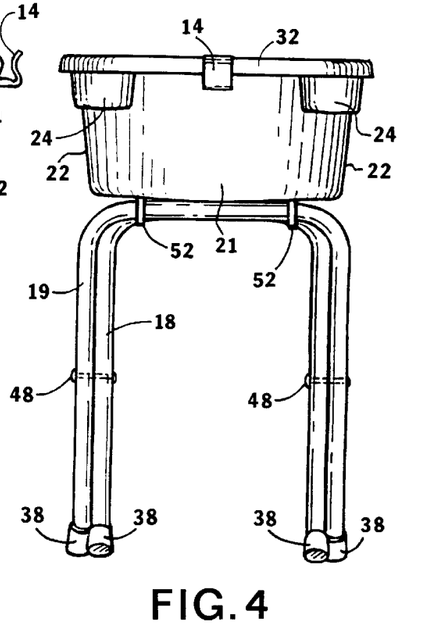
FIG. 4 is a front elevational view of the representative small animal washing container assembly shown in FIG. 1 embodying the features of the present invention.
Figure 5:
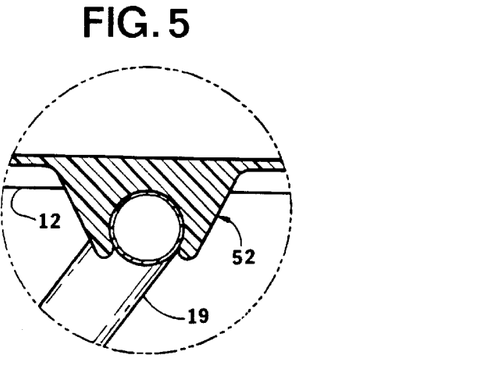
FIG. 5 is an enlarged fragmentary side view, partially in section, of the representative small animal washing container shown in FIG. 1 illustrating a leg snap-mounting rib and foldable support leg embodying the features of the present invention.

As best shown in FIG. 5, washing container assembly 10 further includes a plurality of integrally formed leg snap-mounting ribs 52, preferably four, located on the underside surface of bottom 13 of housing 12 for engaging support legs 18 and 19. Support legs 18 and 19 are snap-mounted into ribs 52 on bottom 13 elevating the container to a height which allows the person washing the pet to stand while administering the bath. The support legs 18 and 19 are pinned using any suitable pins 48 at a predetermined location to give structure to the legs and allow them to be folded. They have a generally U-shaped profile as shown in FIG. 4 and fit together one nested inside the other. Moreover, the support legs 18 and 19 may also have non-skid feet 38 to prevent slippage on the bottom surface of the bathtub 40. Non-skid feet 38 are located on the ends of each support legs 18 and 19.

As best shown in FIGS. 1 and 2, slots 30 may be formed through rim 32 preferably adjacent endwalls 21 to provide a means for attaching a pet restraint strap 16. In addition, a plurality of pockets 24 may also be integrally formed into the outside corners of the housing 12 which are useful in holding bathing articles such as shampoo 26, or a sponge 28. Each pocket 24 preferably has a hole 25 in the bottom to allow water to drain and have a depth a little less than half that of housing 12.

As referred to earlier, FIGS. 11–13 illustrate a first alternative embodiment of washing container assembly 10. With the exception of new or different elements, the reference numerals of elements in this embodiment generally correspond to the elements of the embodiment disclosed in FIGS. 1–10 followed by a "prime" symbol. Moreover, except as noted below, this first alternative embodiment of container assembly 10' incorporates all of the advantages, operates, utilizes and is constructed from the same materials, and is sized substantially the same as container assembly 10.

In a preferred embodiment, bottom 13', endwalls 21' and sidewalls 22' of housing container 12' are integrally formed to create a generally rectangular shaped housing 12'. The width or distance between the sidewalls 22' is sufficiently wide, such as 16 inches, to allow a small dog 23 the ability to turn around. As discussed below in greater detail, a generally rectangular shaped housing container 12' will enable a user to easily and inexpensively convert a standard rectangular shaped tub or container into the present invention.

Referring to FIGS. 12 and 13, container 12' includes a plurality of drain holes 41', preferably six, through bottom 13' for allowing water and other liquids to drain. In a preferred embodiment, an array of three drain holes 41', which are suitably spaced relative one another, are located directly adjacent each endwall 21'. While holes 41' are larger that holes 41, holes 41' are small enough to filter loose pet hair thus substantially preventing such hair from passing through and potentially clogging the bathtub or shower drain.

FIGS. 11–14 disclose a first alternative means for detachably securing a handle 15 of a water spray head 34 to container assembly 10'. The first alternative handle securing means comprises a water spray head holding clip assembly 14' which, like assembly 14, is specifically designed to engage and secure handle 15 so that the water spray head 34 is oriented in a downward facing position causing the water 11 to spray in a downward spray direction toward the bathtub or shower floor. In a preferred embodiment, clip assembly 14' includes a first substantially flat portion 74 designed to engage or abut against the inner surface of any of the endwalls 21' or sidewalls 22'; a second substantially flat portion 76 integrally attached to first portion 74 so that it extends outwardly from container 12' preferably in a generally horizontal orientation over the peripheral wall rim 32' adjacent upper opening 17'; a generally "U" shaped or "horseshoe" shaped portion 83 attached to the outward most distal end of second portion 76 for holding and detachably securing handle 15 of water spray head 34 in a downward facing position so that it does not rotate or turn during use; and an attachment plate 78 designed to abut against the outer surface of any of the endwalls 21' or sidewalls 22' and is positioned directly opposite first flat portion 74 for engaging portion 74 through endwall 21' or sidewall 22' via any suitable means, such as screws 80, thus securing clip assembly 14' to container 12'.

Figure 14:
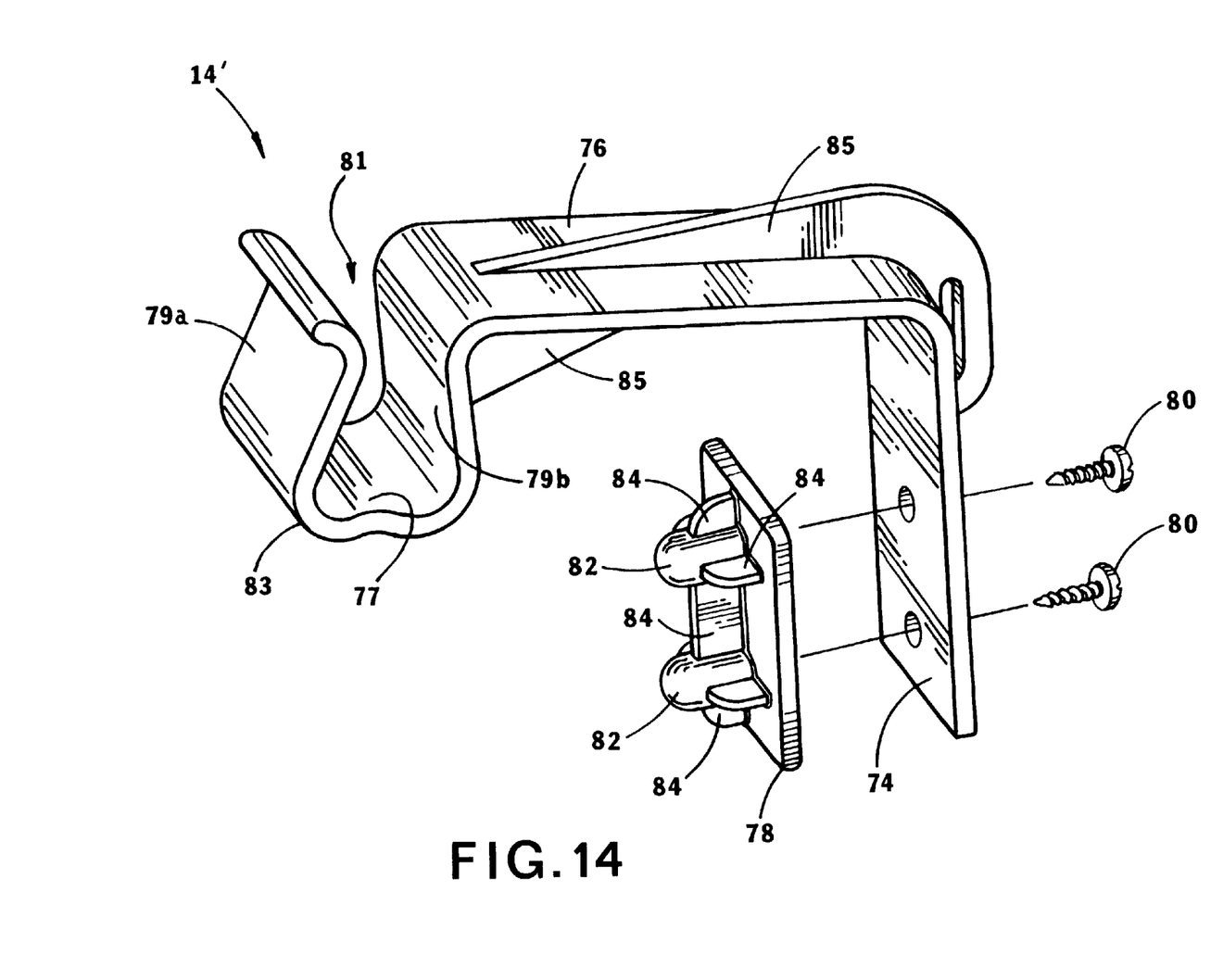
FIG. 14 is a perspective view, partially exploded, of a first alternative embodiment of a water spray head holding clip assembly illustrated in FIGS. 11–13 embodying the features of the present invention.
Figure 15:
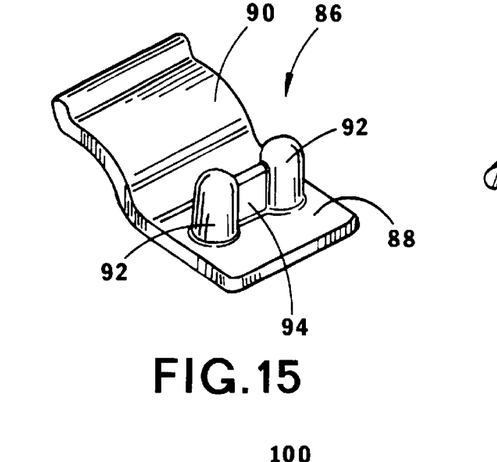
FIG. 15 is a top perspective view of a first alternative embodiment of a leg snap-mounting rib illustrated in FIGS. 11 and 13 embodying the features of the present invention.
Figure 16:
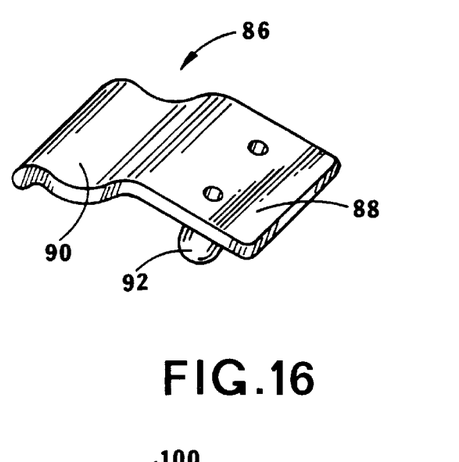
FIG. 16 is a bottom perspective view of the first alternative embodiment of the leg snap-mounting rib illustrated in FIGS. 11, 13 and 15 embodying the features of the present invention.

Horseshoe shaped portion 83 includes a lower central portion 77 for cradling handle 15 and two directly opposed upwardly extending portions 79a and 79b for substantially preventing handle 15 from rotating or turning during use, which converge toward one another from central portion 77 defining a generally narrow neck area 81. In a preferred embodiment, the maximum distance between upward extending portions 79a and 79b occurs directly adjacent central portion 77 and is approximately two inches. The minimum distance, which occurs at neck area 81, is approximately 0.566 inches. These dimensions are particularly compatible for almost all commercially available water spray heads.

The attachment plate 78 preferably includes two cylindrical bosses 82 for receiving screws 80 and are reinforced with a plurality of stiffener ribs 84. In order to secure clip assembly 14' to container 12', screws 80 are simply inserted through first flat portion 74 and endwall 21' or sidewall 22' and screwed into bosses 82. It should be noted that clip assembly 14' may further include stiffener ribs 85 for reinforcement purposes.

As shown in FIGS. 11, 13, 15 and 16, washing container 10' may further include a plurality of detachable leg snap-mounting ribs 86, preferably four, located on the underside surface of bottom 13' for engaging and securing support legs 18 and 19 which elevate container 12' as described above. Each rib 86 includes a flat portion 88 for abutting against and engaging the underside surface of bottom 13' and a capturing portion 90 attached to flat portion 88 and extending away from the underside surface of bottom 13' for snap capturing support legs 18 and 19 such that they are wedged between portion 90 and bottom 13'. Each flat portion 88 preferably includes two cylindrical bosses 92 for receiving and engaging screws 96 and are reinforced by stiffener ribs 94. In order to secure ribs 86 to container 12', screws 96 are simply passed through the top side surface of bottom 13' and screwed into bosses 82.

In view of the above, it can be appreciated that clip assembly 14' and leg snap-mounting ribs 86 may be used as a kit of parts for converting an ordinary washing container into the present invention. If desired, the kit of parts may further include foldable support legs 18 and 19 for the purposes set forth above; an instruction sheet including among other things directions on how to create a suitable array of drain holes 41' in accordance with the present invention defined above; and a plurality of screws 80 and 96 for accomplishing the attachment methods described above.

Figure 17:
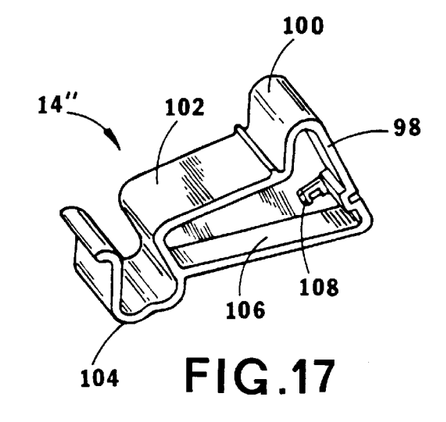
FIG. 17 is a perspective view of a second alternative embodiment of a water spray head holding clip assembly embodying the features of the present invention.
Figure 18:
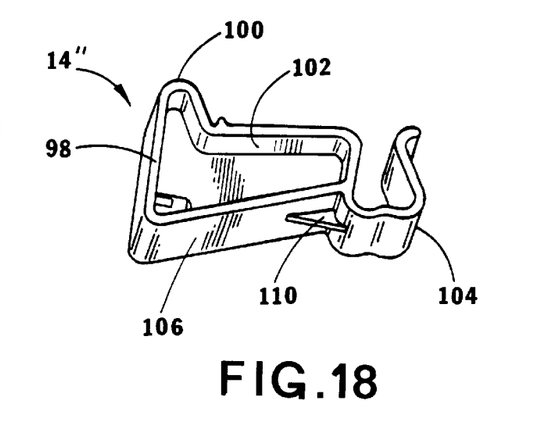
FIG. 18 is another perspective view of the second alternative embodiment of the water spray head holding clip assembly shown in FIG. 17 embodying the features of the present invention.
Figure 19:
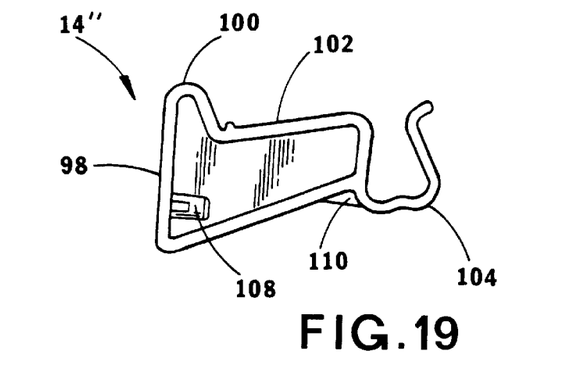
FIG. 19 is a side elevational view of the second alternative embodiment of the water spray head holding clip assembly shown in FIG. 17 embodying the features of the present invention.

While a description of the present invention has been provided in detail, such description is for illustrative purposes only, and it is to be understood that changes and variations may be made without departing from the spirit and scope of the present invention. For instance, FIGS. 17–19 disclose a second alternative means for detachably securing a handle 15 of a water spray head 34 to container assembly 10 or 10'. The second alternative handle securing means comprises a water spray head holding clip assembly 14" which, like assemblies 14 and 14', is specifically designed to engage handle 15 so that the water spray head 34 is oriented in a downward facing position causing the water 11 to spray in a downward spray direction toward the bathtub or shower floor. In a preferred embodiment, clip assembly 14" includes a first substantially flat portion 98 designed to engage or abut against the outer surface of any of the endwalls 21 or 21' or sidewalls 22 or 22'; an inverted generally "U" shaped portion 100 integrally attached to flat portion 98 and coextensive with or corresponding to the shape of the underside surface of peripheral wall rim 32 or 32' for engaging such surface; a second substantially flat portion 102 integrally attached to portion 100 so that it extends outwardly from container 12' in a generally horizontal orientation under the peripheral wall rim 32 or 32' adjacent upper opening 17 or 17'; a generally "U" shaped or "horseshoe" shaped portion 104, which is substantially the same as second portion 83 of clip assembly 14', attached to the outward most distal end of second portion 102 for holding and detachably securing handle 15 of water spray head 34 in a downward facing position so that it does not rotate or turn during use; a third substantially flat portion 106 integrally attached to the lower most end of flat portion 98 and portion 104 for providing structural strength to assembly 14"; and at least one cylindrical boss 108 for receiving any suitable attachment means such as screws. In order to secure clip assembly 14" to container 12 or 12', the first flat portion 98 is positioned flush against the outer surface of one of the endwalls 21 or 21' or sidewalls 22 or 22' and is further positioned so that the inverted generally "U" shaped portion 100 engages the underside surface of wall rim 32 or 32'. Next, the screw means are simply passed through endwall 21 or 21' or sidewall 22 or 22' and screwed into boss 108 thus securing assembly 14" to housing 12 or 12'. It should be noted that clip assembly 14" may further include at least one stiffener rib 110 for reinforcement purposes. It will be further appreciated to one skilled in the art that the clip assemblies 14, 14' and 14" may be used singularly or in combination with one another and may all be packaged in the same kit.

What is claimed is:

1. A small animal washing container assembly for bathing or grooming a small animal, said container assembly comprising:

(a) an open-topped housing container having a bottom and a peripheral wall integrally attached to and extending upwardly from said bottom;

(b) said peripheral wall including sidewalls and endwalls integrally formed to define an upper opening for receiving a small animal therein;

(c) said bottom sloping inwardly and in a slightly downward direction from said sidewalls to define a centralized drain and pet hair filter channel;

(d) said filter channel running lengthwise along said bottom and spanning substantially the entire length thereof, said filter channel further including a generally "V" shaped portion for enhancing the trapping of and decreasing the difficulty in removal of loose animal hair, said "V" shaped portion comprising two downwardly sloping surfaces formed in said bottom which converge together at the center of said housing container to form a generally "V" cross-sectional shape, said "V" shaped portion sloping downwardly from said bottom at a greater angle than said slope of said bottom; and (e) a plurality of drain holes specifically sized and positioned in said "V" shaped portion of said filter channel so as to provide for continuous liquid removal and to trap and filter loose animal hair in a centralized area for easy removal.

2. A small animal washing container assembly for bathing or grooming a small animal, said container assembly specifically adapted for use in a bathtub or shower stall having a conventional hand held flexible water spray head assembly, said container assembly comprising:

(a) an open-topped housing container having a bottom and a peripheral wall integrally attached to and extending upwardly from said bottom, said peripheral wall including sidewalls and endwalls integrally formed to define an upper opening for receiving a small animal therein and a wall rim adjacent said upper opening; and (b) a water spray head holding clip assembly for detachably securing a handle of said water spray head assembly such that said water spray head assembly is oriented in a downward facing position for causing water to spray in a downward direction relative said housing container and for further preventing said handle from rotating or turning during use; said clip assembly comprising a clip mounting extension integrally attached to said wall rim and extending outwardly from said housing container; a water spray holding clip attached to said clip mounting extension, said holding clip including a generally flat portion and a generally "S" shaped portion extending upwardly from said flat portion; and a pair of sidewalls extending along the outer edges of said flat portion for providing additional support and for substantially preventing said holding clip from rotating or turning during use.

3. A small animal washing container assembly as defined in claim 2, wherein said clip mounting extension is integrally attached to said wall rim at one end of said housing container directly adjacent one of said endwalls.

4. A kit of parts for converting an open-topped plastic tub into a small animal washing container assembly, said container assembly specifically adapted for use in a bathtub or shower stall having a conventional hand held flexible water spray head assembly, said tub having a bottom and a peripheral wall integrally attached to and extending upwardly from said bottom, said peripheral wall including sidewalls and endwalls integrally formed to define an upper opening for receiving a small animal therein and a wall rim adjacent said upper opening, said kit of parts comprising a water spray head holding clip assembly having:

(a) a first substantially flat portion designed to engage the inner surface of said peripheral wall;

(b) a second substantially flat portion integrally attached to said first flat portion and extending outwardly from said tub container over said wall rim;

(c) a generally horseshoe shaped portion attached to the outward most distal end of said second flat portion for holding and detachably securing said handle;

(d) an attachment plate designed to engage the outer surface of said peripheral wall directly opposite said first flat portion; and (e) means for engaging said first flat portion and said attachment plate so as to secure said clip assembly to said housing container.

* * * * *